(12) United States Patent
Klassen et al.

(10) Patent No.: US 8,892,353 B2
(45) Date of Patent: *Nov. 18, 2014

(54) METHODS, DEVICE AND SYSTEMS FOR DETERMINING ROUTE METRICS USING STORED ROUTE INFORMATION

(71) Applicant: Research in Motion Limited, Waterloo (CA)

(72) Inventors: Gerhard Dietrich Klassen, Waterloo (CA); Raymond Paul Vander Veen, Waterloo (CA); Sherryl Lee Lorraine Scott, Toronto (CA); David Paul Yach, Waterloo (CA)

(73) Assignee: BlackBerry Limited, Waterloo (CA)

( * ) Notice: Subject to any disclaimer, the term of this patent is extended or adjusted under 35 U.S.C. 154(b) by 17 days.

This patent is subject to a terminal disclaimer.

(21) Appl. No.: 13/862,606

(22) Filed: Apr. 15, 2013

(65) Prior Publication Data

US 2013/0282278 A1   Oct. 24, 2013

Related U.S. Application Data

(63) Continuation of application No. 12/559,216, filed on Sep. 14, 2009, now Pat. No. 8,437,951.

(51) Int. Cl.
*G01C 21/00* (2006.01)
*G01C 21/20* (2006.01)
*A63B 24/00* (2006.01)
*A63B 71/06* (2006.01)

(52) U.S. Cl.
CPC ......... *G01C 21/00* (2013.01); *A63B 2024/0081* (2013.01); *G01C 21/20* (2013.01); *A63B 2220/12* (2013.01); *A63B 24/0084* (2013.01); *A63B 2225/50* (2013.01); *A63B 2071/0691* (2013.01); *A63B 2220/14* (2013.01)
USPC ........................... 701/408; 701/422; 701/454

(58) Field of Classification Search
USPC ............ 701/408–423, 454; 455/456.1–456.5; 340/992–994
See application file for complete search history.

(56) References Cited

U.S. PATENT DOCUMENTS

| 4,220,996 | A | 9/1980 | Searcy |
| 5,451,922 | A | 9/1995 | Hamilton |
| 5,511,045 | A | 4/1996 | Sasaki et al. |
| 5,960,440 | A | 9/1999 | Brenner et al. |
| 6,013,007 | A | 1/2000 | Root et al. |
| 6,463,385 | B1 | 10/2002 | Fry |
| 6,505,106 | B1 | 1/2003 | Lawrence et al. |

(Continued)

FOREIGN PATENT DOCUMENTS

| DE | 3248565 | 7/1984 |
| DE | 20301134 | 6/2003 |

(Continued)

*Primary Examiner* — Richard Camby
(74) *Attorney, Agent, or Firm* — MBM Intellectual Property Law, LLP

(57) ABSTRACT

The disclosure is directed to a method, computer program product, mobile device or a system allowing for determining various route metrics based on stored route records associated with routes traversed by the mobile device. The determination of a route metric may utilize processing of a single route record or multiple route records. Exemplary route metrics include route timing metrics such as lap times, or route record metrics. Configurations of computer program products, mobile devices and systems for enabling the determination of various route metrics are also described.

22 Claims, 8 Drawing Sheets

(56) References Cited

U.S. PATENT DOCUMENTS

| | | |
|---|---|---|
| 6,603,711 B2 | 8/2003 | Calace |
| 6,837,827 B1 | 1/2005 | Lee et al. |
| 6,947,976 B1 | 9/2005 | Devitt et al. |
| 6,959,198 B2 | 10/2005 | Mitsugi |
| 7,031,225 B2 | 4/2006 | McDonald |
| 7,236,091 B2 | 6/2007 | Kiang et al. |
| 7,289,016 B2 | 10/2007 | Luebke et al. |
| 7,565,155 B2 * | 7/2009 | Sheha et al. ............... 455/456.1 |
| 7,881,730 B2 * | 2/2011 | Sheha et al. ............... 455/456.1 |
| 8,095,152 B2 * | 1/2012 | Sheha et al. ............... 455/456.1 |
| 2003/0202558 A1 | 10/2003 | Chung et al. |
| 2004/0006445 A1 | 1/2004 | Paek |
| 2004/0164897 A1 | 8/2004 | Treadwell et al. |
| 2005/0146989 A1 | 7/2005 | Hallberg |
| 2005/0250458 A1 | 11/2005 | Graham et al. |
| 2006/0007786 A1 | 1/2006 | Sakata |
| 2006/0176216 A1 | 8/2006 | Hipskind |
| 2006/0187028 A1 | 8/2006 | Kiang et al. |
| 2007/0076528 A1 | 4/2007 | Kirby |
| 2007/0208531 A1 | 9/2007 | Darley et al. |
| 2007/0219686 A1 | 9/2007 | Plante |
| 2007/0222580 A1 | 9/2007 | Chapman et al. |
| 2007/0287596 A1 | 12/2007 | Case et al. |
| 2008/0018532 A1 | 1/2008 | Mackintosh et al. |
| 2008/0046179 A1 | 2/2008 | Mackintosh et al. |
| 2008/0109158 A1 | 5/2008 | Huhtala et al. |
| 2008/0284650 A1 | 11/2008 | MacIntosh et al. |
| 2009/0009321 A1 | 1/2009 | McClellan et al. |
| 2009/0043531 A1 | 2/2009 | Kahn et al. |

FOREIGN PATENT DOCUMENTS

| | | | |
|---|---|---|---|
| EP | 1840809 | 10/2007 | |
| FR | 2655455 | 6/1991 | |
| GB | 2440975 | 2/2008 | |
| JP | 11166988 | 6/1999 | |
| JP | 2001268638 | 9/2001 | |
| WO | 02037696 | 5/2002 | |
| WO | 0255960 | 7/2002 | |
| WO | 02055960 | 7/2002 | |
| WO | 2008/105651 | * 9/2008 | ............... G01S 5/00 |
| WO | 2008105651 | 9/2008 | |

* cited by examiner

METHODS, DEVICE AND SYSTEMS FOR DETERMINING ROUTE METRICS USING STORED ROUTE INFORMATION

CROSS-REFERENCE TO RELATED APPLICATIONS

This application is a continuation application of U.S. patent application Ser. No. 12/559,216 filed on Sep. 14, 2009. The forgoing application is incorporated by reference herein in its entirety.

TECHNICAL FIELD

The present disclosure relates generally to mobile devices and, in particular, to techniques for determining various route metrics associated with a route traversed by the mobile device.

BACKGROUND

Mobile devices have been developed which have the capability to identify their own location. These devices may exemplarily use GPS or other technologies. Mobile devices are particularly suited to applications facilitating navigation or location-based applications or services, on account of their portability. Mobile devices may be wireless communication devices such as cellular telephones, handheld PDAs, and the like, which are now capable of supporting features beyond voice or text-based communication between users, such as multimedia features.

Various forms of location-based services are known in the art. At least some of these services are configured relative to a check point, fixed either by a physical limitation or otherwise.

Various conventional approaches have proposed the storage of information regarding the route traversed by the mobile device. However, the approaches for determining useful parameters from such stored information have been limited.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
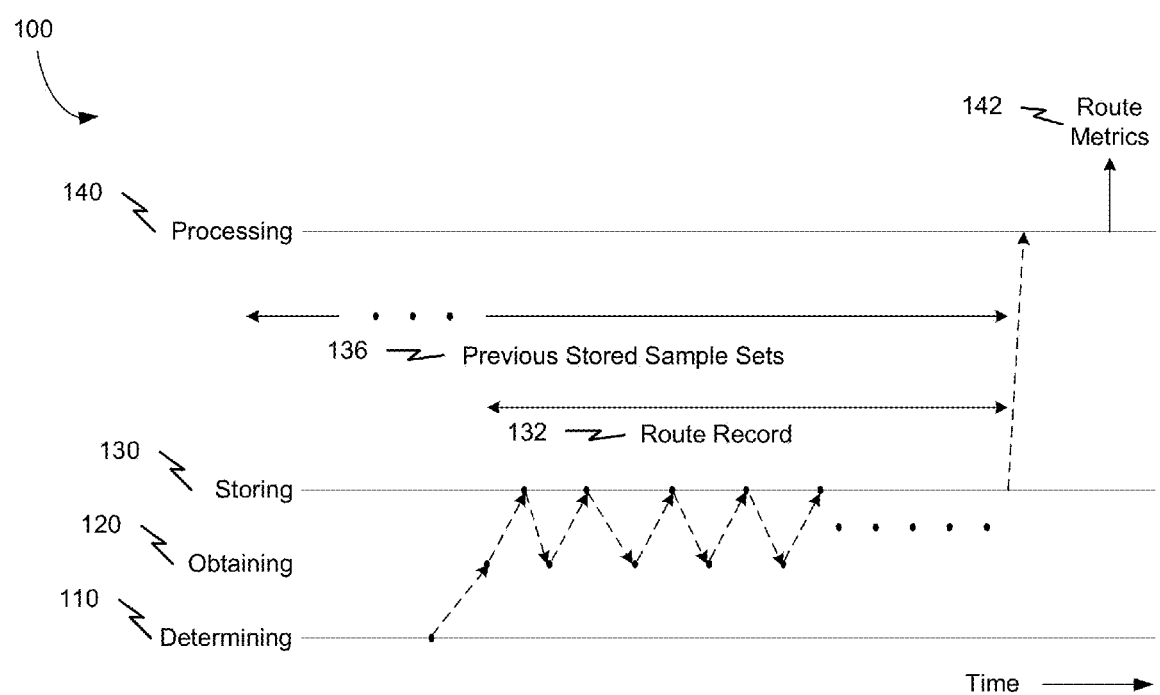
FIG. 1 illustrates an exemplary timing sequence diagram for the method of the disclosure for determining one or more route metrics.

The present technology generally provides a method, a computer program product, a mobile device or a system allowing for determining various route metrics associated with a route traversed by the mobile device. Exemplary route metrics include route timing metrics such as lap times, and route record metrics.

Accordingly, an aspect of the present technology is a method of determining one or more route metrics for a mobile device configured to allow a determination of its location, the method comprising the steps of: determining if a reference stimulus is actuated; obtaining and storing in real-time a route record comprising a plurality of sample sets, said sample sets comprising simultaneous time and location data of said mobile device traversing a route after the actuation of the reference stimulus; and processing previously stored sample sets to at least partially determine said one or more route metrics.

Another aspect of the present technology is a computer program product configured to determine one or more route metrics for a mobile device configured to allow a determination of its location, the computer program product comprising code which, when loaded into a memory and executed on an associated processor, is adapted to perform: determining if a reference stimulus is actuated; obtaining and storing in real-time a route record comprising a plurality of sample sets, said sample sets comprising simultaneous time and location data of said mobile device traversing a route after the actuation of the reference stimulus; and processing previously stored sample sets to at least partially determine said one or more route metrics.

Yet another aspect of the present technology is a mobile device configured to determine one or more route metrics, said mobile device comprising: a sensing module configured to determine whether a reference stimulus is actuated; a location identification module configured to obtain location data of said mobile device, after receiving a notification from the sensing module that the reference stimulus is actuated; and a processing module operatively coupled to the sensing module and the location identification module, said processing module configured to obtain time data in a simultaneous fashion with the location identification module obtaining the location data, said time and location data at least partially defining a sample set and a plurality of sample sets defining a route record, said processing module further configured to process previously stored sample sets to at least partially determine said one or more route metrics.

The disclosure is directed to a method, computer program product, mobile device or a system allowing for determining various route metrics based on route records associated with routes traversed by the mobile device. The determination of a route metric may utilize processing of a single route record or multiple route records. Exemplary route metrics include route timing metrics such as lap times, and route record metrics. Configurations of computer program products, mobile devices and systems for enabling the determination of various route metrics are also described.

Route Records & Determination of Route Metrics

The method of the present disclosure may be configured to obtain and store in real-time one or more route records associated with routes traversed by the mobile device after the actuation of a reference stimulus. The route record comprises a plurality of sample sets, each sample set comprising simultaneous time and location data of the mobile device. A worker skilled in the art would readily appreciate that at least in some embodiments, the location data may be represented by a vector.

Route records such as described above may be used for various applications. For example, route records for two different routes may at least partially be compared to verify if the routes are substantially the same.

Route metrics are at least partially determined by processing previously stored sample sets, either of the same route record or different route records. The determination of a route metric may thus utilize processing of a single route record or multiple route records.

Referring to FIG. 1, the method 100 of determining one or more route metrics 142 involves determining 110 if a reference stimulus is actuated, followed by obtaining 120 and storing 130 of sample sets to form a route record 132 for a route traversed by the mobile device after the actuation of the reference stimulus. At least a portion of the previously stored sample sets 136 are then processed 140 to determine the route metrics 142. In embodiments, the sample sets used for processing 140 may be limited to the sample sets of the current route record 132 or may also use sample sets of additional route records that have been previously stored. Previously stored route records may not all belong to the same user or mobile device and as such may also include historical route records of other users or mobile devices.

The timing sequence diagram of FIG. 1 is illustrative only and is not intended to limit the scope of the disclosure. For example, a worker skilled in the art will appreciate that the obtaining and storing of the sample sets may not occur sequentially but may also happen in parallel especially if the obtaining and storing of the different types of data (e.g. location, time) that constitute the same sample set occur at different speeds. In embodiments, the storing of the time data may be under way while the corresponding location data is still being obtained.

Additionally, the processing 140 of the previously stored sample sets 136 need not only occur just after the obtaining 120 and storing 130 of the entire route record 132, but may also occur in real-time. In embodiments, real-time processing capability of previously stored sample sets is used for determining and mapping instantaneous velocities or accelerations or both, along the route.

Acts associated with the method described herein can be implemented as coded instructions in a computer program product. In other words, the computer program product is a computer-readable medium upon which software code is recorded to execute the method when the software code is loaded into a memory and executed on an operatively associated microprocessor, exemplarily of the mobile device or a system.

In embodiments, acts associated with the method described herein can be implemented as coded instructions in plural computer program products, each of the computer program products being a computer-readable medium upon which software code is recorded to execute appropriate portions of the method when the software code is loaded into memory and executed on an operatively associated microprocessor.

Figure 9:
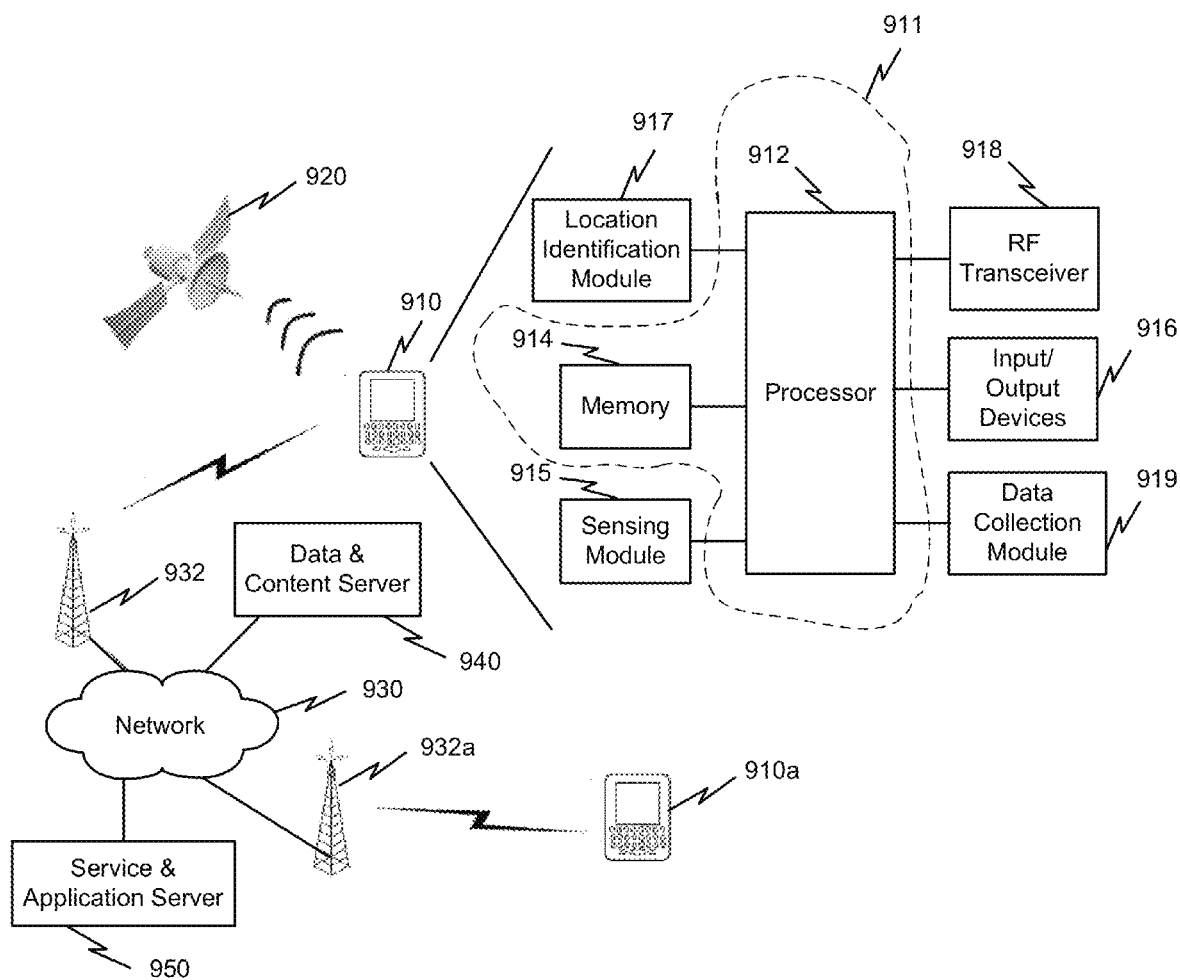
FIG. 9 is a schematic of an exemplary network configured for developing custom routes based on specified parameters.

Exemplarily referring to FIG. 9, portions of the method may be performed using a first mobile device 910, while portions of the method may be performed using a communicatively linked second mobile device 910a, one or more servers 940, 950, or the like. The communication network 930 facilitates the sharing of information (e.g. location or time data) and any required signalling needed for coordinating the execution of the entire method.

Route Timing Metrics

In embodiments, the method of the present disclosure may be used to determine one or more route timing metrics. In embodiments, location data of previously stored sample sets are compared to determine one or more matched sample sets, based on a match criterion. The time data of the matched sample sets is at least partially used to determine the route timing metrics.

In embodiments, the actuation of a lap reference stimulus is used to define a lap reference sample set and thus a lap reference point. A sample set is determined as a matched sample set if a comparison of its location data satisfies a match criterion with the location data of the lap reference sample set. Lap times for a route can be determined by using the time data of the matched sample sets and the lap reference sample set.

Figure 2:
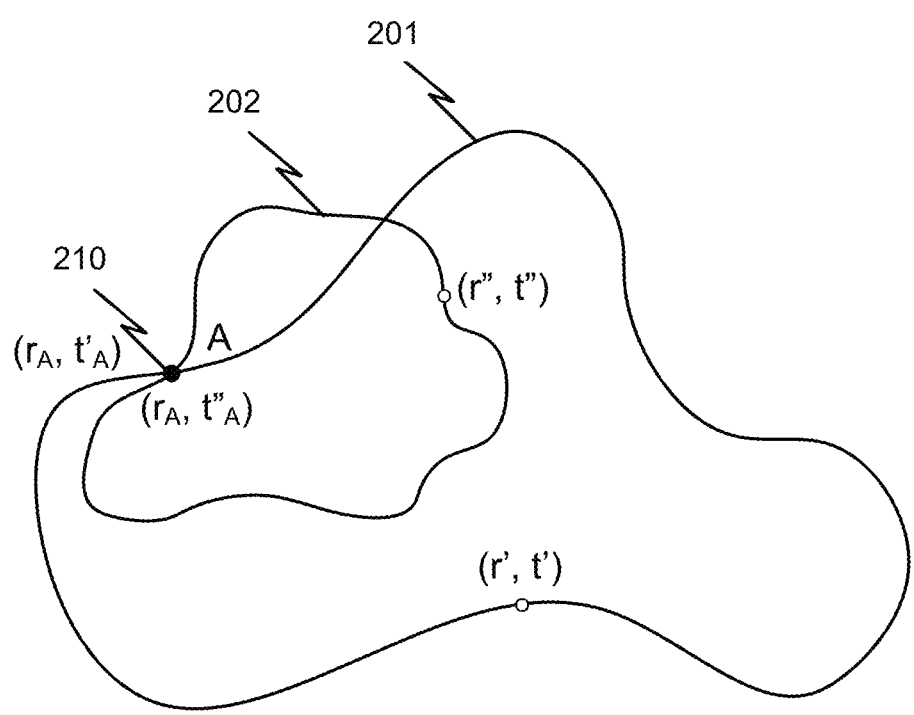
FIG. 2 illustrates an exemplary scenario of the application of the method of the disclosure for determining a lap time (an exemplary route timing metric).

Referring to FIG. 2, a lap time for a first lap 201 may be calculated with respect to a lap reference point A 210 based on the matched sample set $(r'\sim r_A, t')$ and $(r_A, t'_A)$ where $\sim$ indicates that the match criterion is satisfied. A lap time for a second lap 202 may be calculated based on the matched sample set $(r''\sim r_A, t'')$ and $(r_A, t''_A)$. Lap times for different laps may be compared for determining which lap was quicker. The location data of the route records of different laps may also be compared to determine if the laps were substantially the same.

Figure 3:
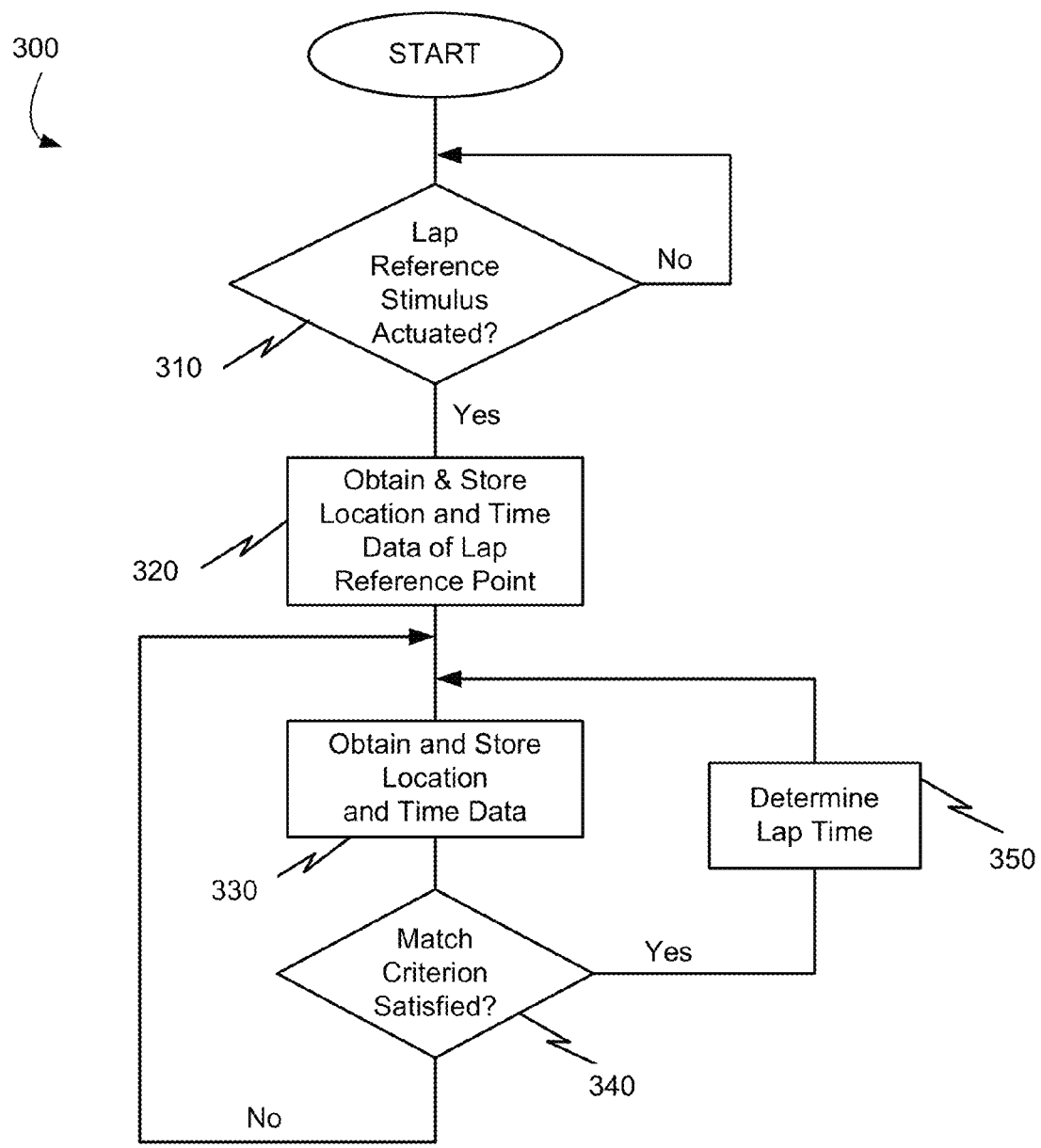
FIG. 3 illustrates an exemplary flow chart presenting the method for determination of lap time.

FIG. 3 illustrates an exemplary real-time implementation of the method of the disclosure for definition of a lap reference point, and calculation of lap times. The method 300 comprises: determining 310 whether a lap reference stimulus has been actuated; obtaining and storing 320 location and time data of the lap reference point defined by the actuation of the lap reference stimulus; obtaining and storing 330 in real-time time and location data of the mobile device traversing a lap, to form a lap record; comparing 340 location data for a match as specified by a match criterion, and determining 350 lap time if the match criterion has been satisfied.

In one embodiment, computation of path length may be used to determine lap distance, or combined with lap time information to provide average speed during a lap. In some embodiments, a path length may be computed or approximated to facilitate providing data such as distance travelled along a path, proportion of total distance travelled, average speed or velocity, or the like. Computation of path lengths may be performed by application of methods as would be readily understood by a worker skilled in the art, such as curve rectification methods, approximation by straight line segments, numerical integration, or the like.

Figure 4:
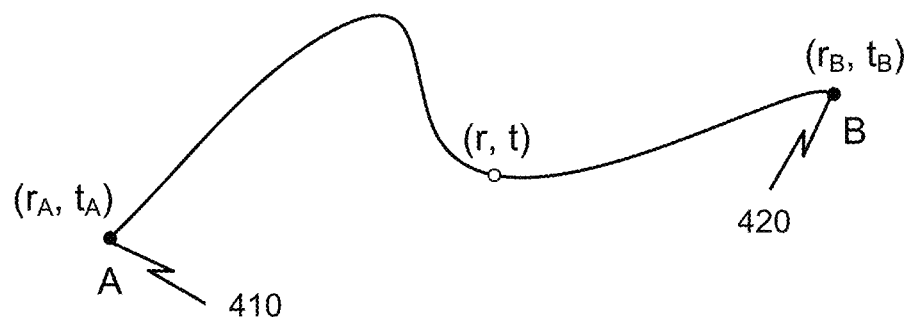
FIG. 4 and FIG. 5 illustrate exemplary scenarios, wherein the method of the disclosure may be applied for determining a split time (an exemplary route timing metric).

In embodiments, a split time representing the time for traversing a route between a start reference point and a stop reference point, can be determined. Referring to the scenario of FIG. 4, reference points A 410 and B 420, arbitrarily defined apriori or at least partly in real time, may be considered as start reference point and stop reference point respectively. A split time for a user travelling from start reference point A 410 and stopping at stop reference point B 420 is calculated as follows: The time and location data of the mobile device at the start reference point is obtained and stored to define a start reference sample set $(r_A, t_A)$. A plurality of sample sets $(r,t)$ of simultaneous time and location data are obtained and stored following the start reference stimulus, to form a route record. The plurality of sample sets generally represents time and location data obtained, exemplarily in real time at a predetermined fixed or variable sampling rate. The location data r of each sample set $(r,t)$ is compared with the location data $r_B$ of the stop reference point B 420 to determine if there is a match, as specified by a predetermined or chosen match criterion. For all matched sample sets (r~$r_B$, t), the split times are determined based on the time data of the matched sample sets and the start reference sample set.

Figure 5:
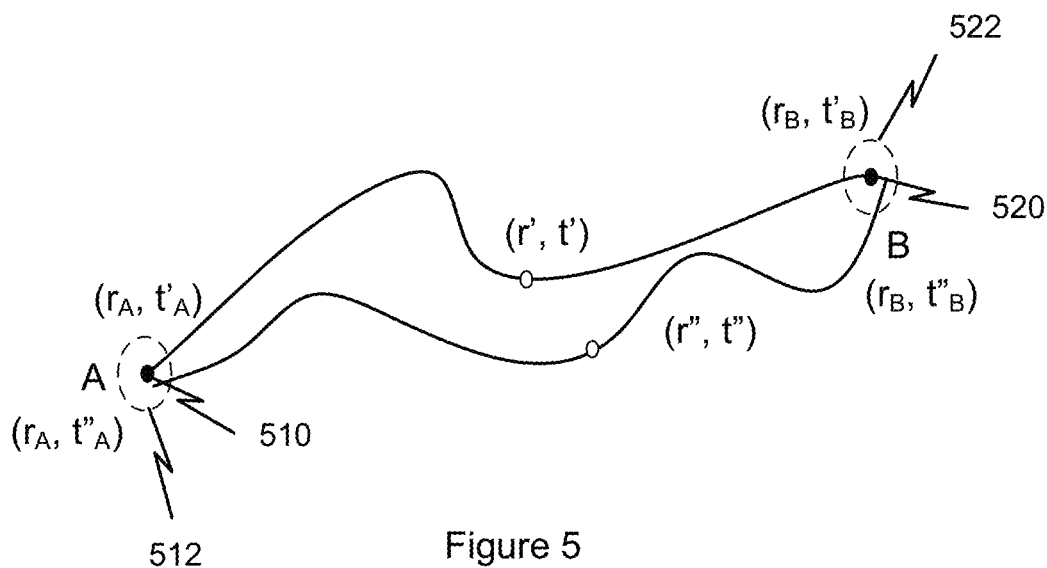

Referring to FIG. 5, split times for different routes between a reference point A 510 (defined in a first scenario as a start reference point for a route), and a reference point B 520 (defined in this scenario as a stop reference point for a route) can be compared. The first split time is determined based on the time data of matched sample set (r'~$r_B$,t') and the start reference sample set ($r_A$,$t'_A$), while the second split time is determined based on the time data of matched sample set (r"~$r_B$,t") and the start reference sample set ($r_A$,$t''_A$).

Methods of the present disclosure may also be configured for the measurement of bi-directional split times. In this scenario, the first split time refers to the time taken for the travel from a reference point X to a reference point Y, while the second split time refers to the time taken for the travel from reference point Y to the reference point X.

Comparison of split times for substantially differing routes may be utilized for determining, for example, a faster route between two reference points. In embodiments, the methods of the disclosure may be configured to define a split time if the route traversed by the mobile device is substantially similar to a route that is pre-determined or specified or previously traversed.

The match criterion may be pre-determined or chosen. In embodiments, methods of the present disclosure may be configured to consider a sample set (r',t'), (r",t") as a matched sample set, if its location data r',r" is within a chosen or predetermined range of the location data $r_B$ or $r_A$ of the reference points B 520 or A 510, respectively. This is indicated in FIG. 5, by the dotted ellipses 512, 522 around reference points A 510 and B 520, the sizes of which can be optionally modified depending on the preference of the user or the resolution of the technology utilized by the means for determining the location, and may be different for the start and stop reference points.

Methods of the present disclosure may also utilize alternative match criteria. In embodiments, the match criterion may be defined such that the criterion is satisfied at a specific location if there is substantial orthogonality between the following two vectors: the instantaneous velocity vector of the mobile device at the specific location; and the vector difference between the location vectors defining the specific location and the stop reference point. For embodiments using this match criterion, the split time may not be determined based on the time data of the first instance of the mobile device being in the proximity of the stop reference point.

Exemplarily, a plurality of sample sets may be processed to determine an estimated time of arrival for a destination point.

Route Record Metrics

Figure 10:
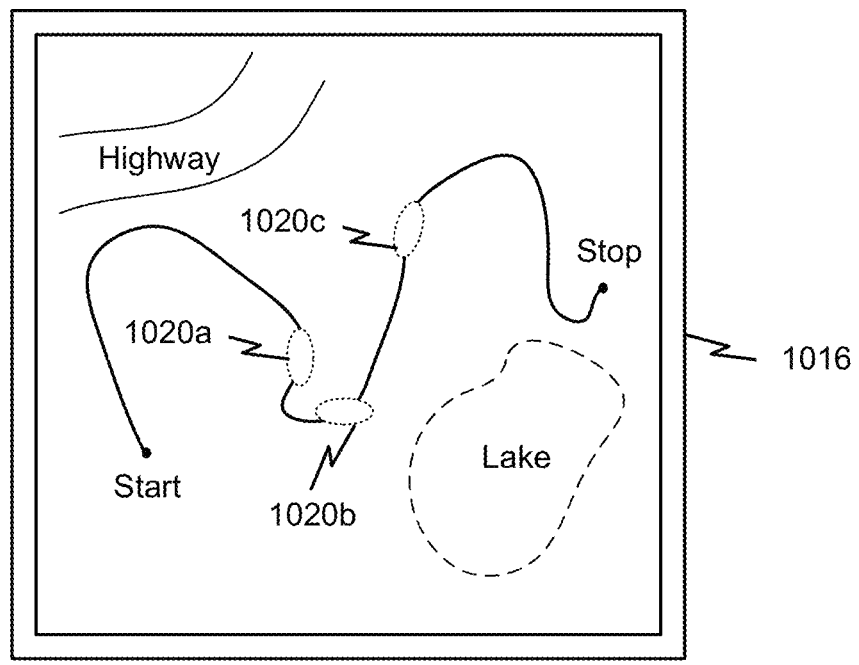
FIG. 10 is an illustration of a user interface of the mobile device displaying gaps in the a route record.

"Gaps" in a route record can be created when at least a portion (e.g. time data, location data) of the corresponding sample sets does not meet an accuracy criterion, for example, is lacking in accuracy or resolution, or is altogether missing. Exemplarily, for a mobile device utilizing GPS-based technology, location data may be missing when there is signal loss between the mobile device and the GPS-satellite system. The accuracy criterion may be predetermined or selected by a user. As exemplarily shown in FIG. 10, the user interface 1016 of the mobile device may be configured to display the route and to indicate such gaps 1020a, 1020b, 1020c therein.

The route record may be enhanced by determination of sample sets corresponding to the gaps in the route record by interpolation or extrapolation of previously stored sample sets that have satisfactory accuracy. A worker skilled in the art would be familiar with appropriate interpolation and extrapolation techniques. The sample sets corresponding to the gaps in the route record may therefore be considered as route record metrics.

Appropriate interpolation and extrapolation techniques may exemplarily include but are not limited to the following: a straight-line interpolation technique; techniques utilizing geographical information (e.g. map data) for interpolation; techniques utilizing historical route records; or a combination of the above techniques.

In embodiments, the inserted route record metrics for the gaps in the route record may also utilize sample sets of previous instances of travel on the same or sufficiently similar route. Exemplarily, the historical route records of the mobile device's user may be used for updates. Historical route records of other users may also be used to determine the route record metrics that is to be inserted. For example, records of a previous group of athletes may be used. For example, curve-fitting methods such as the method of least squares may utilize such information to insert route data, as would be readily understood by a worker skilled in the art.

In embodiments, the geographical terrain information can be utilized to identify or sort one or more options that account for the gaps in the route record. For example, an option that involves a fifteen-foot drop may be set as the least likely option if the user of the mobile device was known to be travelling on foot. Cliffs or walls may be used to define constraints or boundaries on the set of possible routes s when inserting route data. Maximum or minimum instantaneous or average speeds may also be used to define constraints on the set of possible routes when inserting route data.

In embodiments, map data may be used for interpolation and extrapolation. Such map data may include information about known streets or trails in the region. Known streets or trails may be placed as a more likely route in a sorted list of possible routes.

In embodiments, the user of the mobile device may be allowed to validate the sample sets inserted for the gaps in the route record. The user may also be given the option to add additional information to complete the route record. For example, a user may choose to start running even before his/her mobile device has acquired a GPS signal. While the route record will only contain information after the mobile device has established an operative association with the GPS-satellites, the user may be given the option to add the information for the initial part of the route. In embodiments, at least a portion of the sample sets or reference sample set may thus be obtained from a user interface of the mobile device.

In embodiments, the mobile device may prompt the user to at least partially validate the route record if a possible measurement error has occurred. For example, if the user has crossed a wall or cliff boundary, or if the user has exceeded a predetermined maximum instantaneous or average speed, the mobile device may prompt the user to validate the route record. The mobile device may additionally compute and propose a set of likely alternative route records in such cases.

Referring to FIG. 9 and in accordance with some embodiments, the mobile device also comprises a data collection module 919, which may be configured for collection of other forms of data (e.g. audio, video, images, text for example short messages from the user, monitoring data for example heart rate measurements, etc), which may be associated with one or more of the sample sets of the route record. In embodiments, the mobile device further comprises a camera, and as such a jogger may take photographs at various locations along the route and associate each photograph with a corresponding sample set which may enhance the route record. In this embodiment, the one or more data files representative of an event (e.g. a running event) can be created that include various additional forms of data (e.g. photos, audio, video etc). Such data may exemplarily allow a user to indicate the mode of transport (e.g. walk, drive) used at various stretches of the route.

Reference Stimulus

The reference stimulus is a signal, trigger, or other stimulus used to enable the definition of a reference point exemplarily by the collection of data (e.g. location data, time data or both). The reference stimulus can be one or more signals of a variety of different types (e.g. an electronic signal, an audio signal, etc.).

A plurality of reference points can be arbitrarily defined by the actuation of corresponding reference stimuli. Each reference point can be associated with a corresponding reference sample set comprising the location data and the time data of the mobile device at the actuation of the reference stimulus.

For example, arbitrarily defining one or more reference points may refer to a feature or capability for selecting substantially any reference point from a predetermined group of reference points, for example substantially any geographic coordinate in a predetermined geographic area. The reference point may be defined via an internal or external source such as a user, computer program, communicatively coupled device, or a combination thereof, for example. In embodiments, the reference points are not pre-programmed or pre-set but can be defined arbitrarily and optionally in real time.

Figure 6:
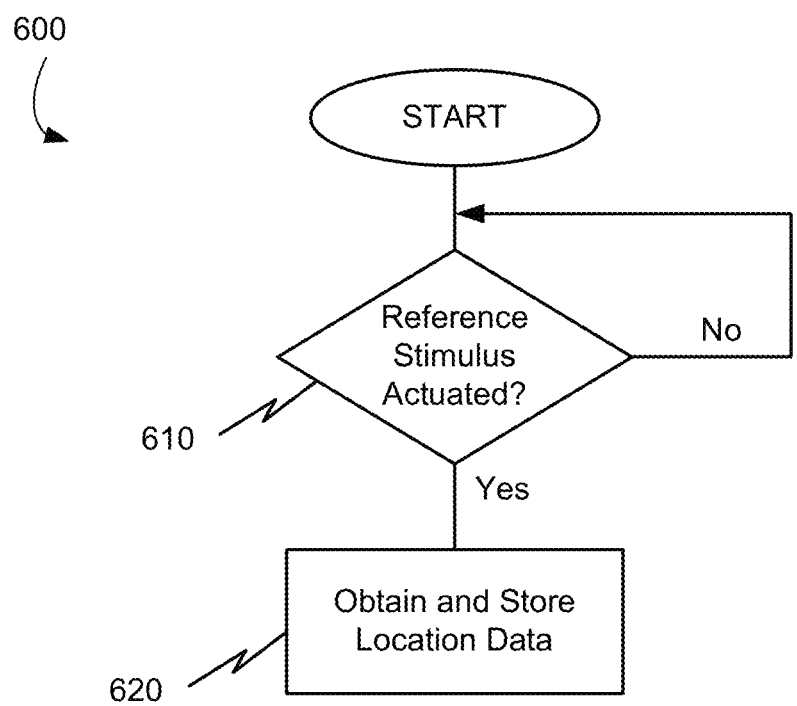
FIG. 6 illustrates an exemplary method of the disclosure for arbitrarily defining a reference point.

FIG. 6 illustrates an exemplary method 600 for arbitrarily defining one or more reference points for a mobile device. The method 600 comprises: determining 610 whether a reference stimulus has been actuated; and obtaining and storing 620 location data of the mobile device substantially at the actuation of the reference stimulus to define a reference point.

In embodiments, the mobile device is configured to define two reference points to serve as a start reference point and a stop reference point. The location and time data of the mobile device at the actuation of a start reference stimulus and a stop reference stimulus are used to create a start reference sample set and a stop reference sample set respectively. In embodiments, the mobile device defines a single lap reference point, at the actuation of a lap reference stimulus. The location and time data of the mobile device at the actuation of the lap reference stimulus is used to create a lap reference sample set.

As noted earlier, the reference stimulus can be one or more signals of a variety of different types (e.g. an electronic signal, an audio signal, etc.). In embodiments, the reference stimulus is an audio signal of a predetermined or chosen frequency or decibel range. Appropriate sensing means may exemplarily use a microphone, and associated electronic circuitry appropriately designed to determine if a received audio signal satisfies the predetermined or chosen frequency or decibel range.

In embodiments, the reference stimulus is an electronic digital signal (e.g. a pre-determined or chosen reference bit sequence). The sensing module may comprise a receiver and logic module configured to compare a received bit sequence for a match with the pre-determined or chosen reference bit sequence. The reference stimulus is determined to be actuated if the comparison reveals a substantial match.

In embodiments, the reference stimulus may be triggered or detected by the actuation of a reference stimulus option by the user of the mobile device. The reference stimulus option may be implemented in either software or hardware. Exemplarily, the reference stimulus may be triggered by actuating an icon displayed on an output user interface, for example using a mouse or a touch screen; or by an actuation of a hardware element such as a button, a combination of keys on a keypad etc. In embodiments, a button is actuated to trigger the reference stimulus and thereby the definition of the reference point.

Alternately, the reference stimulus may be provided by a reference signal sent from a communicatively linked server, or from another mobile device. As the reference points are defined only by the corresponding reference stimuli, they can be arbitrarily chosen from a plurality of possible locations, exemplarily within a predetermined set of locations such as Earth, North America, etc.

In some of the embodiments that define a start reference point as a reference point based on the actuation of a start reference stimulus, the start reference stimulus may be triggered either by the first or last actuation of a start reference stimulus option at a plurality of communicatively linked mobile devices. Exemplarily, each mobile device may be associated with a participant of a race. In this context, all race participants may thus start the race when either the first participant is ready or the last participant is ready. In embodiments, a plurality of mobile devices define their reference points at the actuation of a common reference stimulus from a communicatively linked server, exemplarily actuated by a coach for training of multiple athletes. The reference points for the various athletes may all be distinct, and may be spaced apart by large distances (e.g. in different cities).

The reference points may be defined arbitrarily apriori or at least partly in real-time. In embodiments, the reference points are defined, and stored for use when traversing routes at a later time (e.g. a day later). In embodiments, the reference points are defined in real-time; e.g. at substantially the first instant of starting the route. A reference point may be selected from a predetermined group of points, which may be limited by a predetermined resolution.

Data Collection & Communication

In embodiments, the mobile device allows for transfer of data with other mobile devices or one or more servers communicatively linked with said mobile device. Exemplarily, this data may include the reference stimulus.

In embodiments, the mobile device is a wireless communications device capable of transmitting or receiving information, or both, via a wireless communication medium such as radio, infrared, or the like. The communication capabilities of wireless communications device may include voice communication capabilities, data communication capabilities, or a combination thereof. The term "wireless communications device", for the purposes of this specification, shall include any wireless handheld, smart phone, PDA, tablet, laptop, notebook, netbook, or other communications device that is capable of transmission and reception of data via a wireless communication medium such as radio, infrared or the like.

As discussed earlier, the mobile device may be configured for collection of other forms of additional data (e.g. audio, video, images, short messages from the user etc), which may be associated with or included as part of one or more of the sample sets. The additional data associated with the one or more sample sets may be stored either on the mobile device, or transferred to a server for optionally enabling "play-back" of the event, or transferred to other mobile devices communicatively linked therewith. In embodiments, at least part of the data transfer occurs in real-time.

Exemplarily, the transfer of data allows for simulation of competitive races between users of different mobile devices, even if the users are separated geographically. In an embodiment, audio signals associated with different sample sets may be transferred in real-time fashion to update other race participants that are using the communicatively linked mobile devices, while video signals associated with different sample sets may be transferred to a central server for later playback. In embodiments, both audio and video signals can be transferred to one or more other mobile devices in real time.

A worker skilled in the art would appreciate that the forms of data that may be transferred in real-time may depend on the bandwidth capabilities of the communication network infrastructure providing the data transmission capability. Audio signals may be transferred either in circuit-switched or packet-switched fashion.

In embodiments, part of the data that is transferred is at least partially derived from the sample sets. Exemplarily, an estimated time of arrival at a destination may be determined by processing a plurality of sample sets, and the estimated time of arrival sent to users of other mobile devices, or a central server.

In some embodiments, the data transferred between mobile devices takes the form of one or more short data messages, such as friendly taunts between various race participants. Alternately, the friendly taunts between the competitors may be audio signals. In one embodiment, the communication network may be used by a coach or a race director to transmit a message to training athletes or race participants respectively. The communication signals may be broadcast or multicast (for example, a team leader sending signals to the rest of the team, namely the other mobile devices). Appropriate communication protocols and network architectures that support various types of communication would be readily known to a worker skilled in the art.

In embodiments, the functionality of data transfer is integrated with the one or more computer program products configured to achieve the remaining functionalities of the mobile device (e.g. lap time determination), thus obviating the need for a user to access a separate software module (e.g. email) for data transfer.

As another example, the transfer of data allows for simulation of competitive races between users of different mobile devices, even if they are separated in time. For example, a mobile device may obtain route records indicative of one or more other users' previous performances, or of the same user's performance on a previous occasion. The user may then race against one or more previous users, and optionally record and provide individual or aggregate event information for subsequent usage. Such activity may be regarded for example as a form of interactive time trial. For example, event information may be recorded at a geo-caching site, and retrieved by subsequent devices visiting the site, thereby enabling a combined geo-caching and virtual racing activity.

Custom Route Determination

In embodiments, the mobile device and method of the disclosure may be configured to identify or obtain a custom route for a user that satisfies various parameters.

The processing required for the identification or determination of the custom route may be performed by the mobile device of the user, by a server operated exemplarily by a service and application provider, or by a combination of both. The exact distribution of the processing burden may at least partly depend on the computational capabilities of the different processing entities, and of the communication capabilities between the different entities. One or more load balancing activities may be performed for distribution of processing burden, as would be readily understood by a worker skilled in the art.

Exemplarily, the processing burden for the determination of the custom route may be shifted between the mobile device and a server, based on the time-variant data rates that may be available at the communication link there-between. In embodiments, if the communication link between the mobile device and the server is slow or substantially non-existent, the mobile device may default to determining the custom route itself. If the communication link between the mobile device and the server provides sufficiently high data rates, the computation may be shifted to the server. In these embodiments, the mobile device may be configured, at the time of request for a custom route, to probe the associated communication network to determine potentially available data rates.

Information required for the processing may at least partly be stored on the mobile device of the user, on the server of the service and application provider, or on a server of a data and content provider communicatively linked with the appropriate processing entities. This information may include geographical information, historical route records of users of interest, tourist information, weather parameters etc.

In one embodiment, the method for identifying or determining the custom route comprises the following acts: obtaining location data of a reference point for the development of the custom route, the reference point being the location of a mobile device at the actuation of a reference stimulus; obtaining one or more parameters of a custom route, exemplarily from a user of the mobile device; obtaining information for a region proximal to or including the reference point; and identifying one or more routes, if any, within the region satisfying the parameters, utilizing at least partially the information for the region and the parameters, for selection of a custom route therefrom.

Referring to FIG. 9, the mobile device is a wireless communications device 910 operatively associated with a GPS system 920 allowing for determining its location. The mobile device 910 is linked to a cellular network 930 through a base-station 932, and thereby to one or more servers 950 of a service and application provider, and to one or more servers 940 of a data and content provider. Additional mobile devices 910a may be linked to the cellular network 930 using the same base station 932 or a separate base station 932a. The cellular network 930 thus serves for data transfer between peer mobile devices 932, 932a.

In embodiments, on request of a custom route and parameters of choice from a user of the mobile device 910, the service and application provider obtains various types of information about a region from the data and content provider, and undertakes the processing required for determining if any routes within the region can satisfy the parameters of choice. The results of the processing can be sent back to the mobile device 910 through the cellular network 930 and its base-station 932. A worker skilled in the art would readily appreciate that the same network configuration can be used for providing various other applications, and is not limited to the application of the custom route determination.

The reference point for the development of said custom route may be the location of the user at the actuation of a reference stimulus (i.e., the reference point).

At least some of the parameters for the custom route may be set by the user, or by one or more third parties communicatively linked with the user. Parameters may exemplarily include at least one of the following: start reference point for the custom route, total distance of custom route, total expected time for completion of custom route, terrain parameters such as inclination (e.g. hilly, flat etc.), nature of surface (e.g. paved surfaces, grassy areas etc.), mode of transport (e.g. walking, canoeing etc.), tourist or geographical parameters (e.g. local tourist landmarks, locations with "best views", parks etc). The user may specify desired maximum or minimum limits on quantitative parameters such as route distance, completion time, total vertical travel, or the like.

In embodiments, the user may specify that the custom route satisfy the following parameters, exemplarily based on the mode of transport: a first distance by foot, a second distance by cycling, and a third distance by swimming. Such embodiments may be utilized for designing custom triathlon-type routes in a region of interest relative to an arbitrarily defined reference point.

Exemplarily, the start reference point of a custom route for an athlete may be specified by his/her training coach (third party user). The start reference point may also be derived by a discussion between multiple third party users and the user. The start reference point for the custom route may coincide with the reference point used for the determination of the custom route, or be within a certain geographical distance of the same.

In embodiments, the mobile device may provide a form that allows the user to select one or more options (e.g. using a drop-down menu) for the various parameters for a custom route. The device may also request the user to set default states for at least a few of the parameters.

In embodiments, one or more custom route parameters may be associated with a degree of difficulty for the route. For example, the user may specify a degree of difficulty which represents a collection of parameters for determining the custom route. Alternatively, the degree of difficulty may be calculated based upon user-specified parameters. A degree of difficulty may be used for competitive race purposes, for example.

The identification of one or more custom routes may be first limited to a region of interest including the reference point. Various algorithms may be used for the identification of the custom routes, as would be readily known to a worker skilled in the art.

Figure 7:
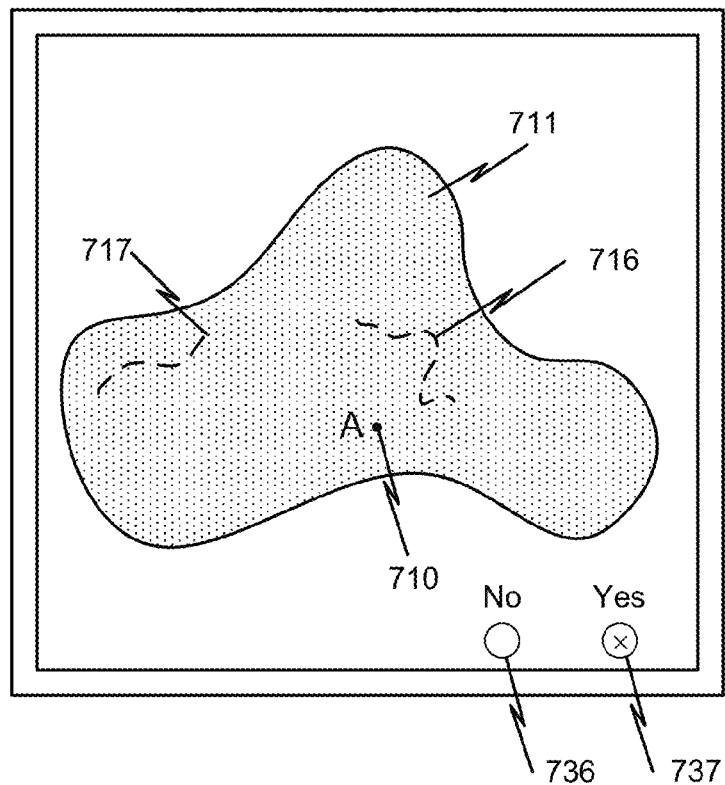
FIG. 7 and FIG. 8 illustrate exemplary scenarios of the application of the method of the disclosure for determination of custom routes.

In one scenario, the processing for the custom routes may determine that multiple routes within the region of interest satisfy the parameters of choice. Referring to FIG. 7, the results of the processing for the custom route are displayed on a user interface of the mobile device for an exemplary scenario where the region of interest 711 including a reference point A 710 has two routes 716, 717 that satisfy the parameters of choice.

Alternately, the processing for custom route determination may result in not finding any suitable custom routes within the region of interest, which sufficiently satisfy the selected parameters. In either case, the user may be provided with options to modify the parameters of the custom route. When multiple routes are found, the user may manually choose one as the custom route. Alternatively, the multiple routes may be sorted or automatically selected based on the previously stored sample sets.

Figure 8:
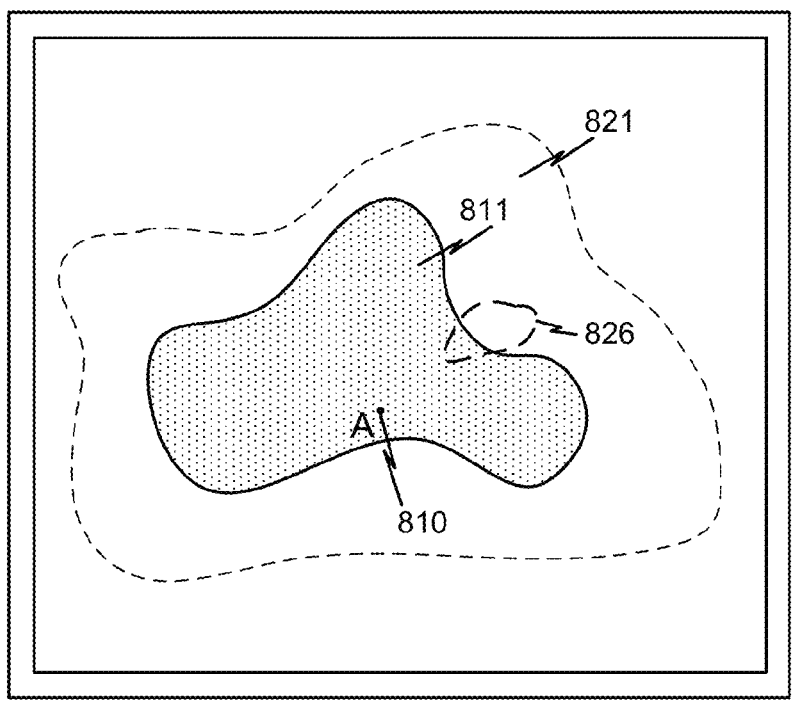

For the scenario when no routes that sufficiently satisfy the parameters are found in the region of interest, the user may be provided with the option of either manually choosing a second region of interest. Referring to FIG. 8, the results of the processing for the custom route are displayed on a user interface of the mobile device for an exemplary scenario wherein the processing within the first region of interest 811 including the reference point A 810 did not provide any satisfactory results. However, processing within a second region of interest 821 results in determining a custom route 826 that satisfies the parameters of choice.

Alternately, the processors may be configured to automatically repeat the calculations for a second region of interest, which may or may not overlap with the first region of interest. The processing algorithms may be configured to minimize the processing when the first and second regions of interest at least partially overlap (for example, FIG. 8).

In embodiments, determining a custom route based on custom route parameters may comprise determining one or more routes which most closely satisfy the custom route parameters. For example, if one or more routes can be found which completely satisfy the parameters, at least one of these routes may be proposed to the user. However, if no route which completely satisfies the parameters can be found, one or more routes which closely satisfy the parameters may be provided to the user for selection.

Mobile Device

The mobile device comprises a processing module, a location identification module and a sensing module. The sensing module is configured to determine whether a reference stimulus is actuated and comprises sensing means appropriate to the nature of the expected reference stimulus. The location identification module is configured to obtain location data of the mobile device and may utilize various technologies, as discussed below. The processing module is operatively associated with the sensing and location identification modules, and may be configured to coordinate their functions, and to process different types of data using one or more processors. In embodiments, the processing module may comprise or be operatively associated with a memory module configured for storage of different types of data. Appropriate processing modules would be readily known to a worker skilled in the art.

As discussed earlier, the reference stimulus may be one or more signals of a variety of types (e.g. audio, digital bit sequence etc). A worker skilled in the art would readily design a suitable sensing module with appropriate sensing means. As such, appropriate sensing means are not to be limited to any exemplary means mentioned herein. Exemplarily, the sensing means may be a microphone if the reference stimulus is an audio signal, or an electronic receiver if the reference stimulus is an electronic bit sequence.

In embodiments, GPS receivers may be used to determine the location of the mobile device(s). However, it should be appreciated that other techniques can be used to determine the current location to a degree of accuracy commensurate with the technique used. For example, cell tower triangulation or radiolocation techniques can be used to generate the current location for the device. Alternatively, the identity (and location) of the cell tower handling the mobile device's communications can be used as a proxy for the location of the mobile device. Another approach for location identification would be to prompt the user of the device to enter his or her current location (e.g. entering a street address, picking a point of interest (POI) from a map or selecting the current location using crosshairs on a map). As yet another example, Global Navigation Satellite Systems (GNSS) or pseudo-satellite systems other than or in addition to a GPS system may be used. For example, GLONASS, Beidou, COMPASS, Galileo, or like systems may be utilized for determining the location. Satellite-based, regional, or network-based augmentation or improvement systems such as WAAS and A-GPS may also be utilized to aid in determining the location of the mobile device.

In embodiments, the location identification module of the mobile device may be configured to trigger at the actuation of a reference stimulus, for determination of the location data at substantially the same instant. A worker skilled in the art would appreciate that the time lag between the actuation of the reference stimulus and the determination of the location data depends on the technology used for determining the location and determining the actuation of the reference stimulus. Appropriate technologies may be chosen to satisfy a predetermined or chosen range for this time lag.

FIG. 9 also shows a block diagram depicting certain main components of an exemplary mobile device 910 with wireless communications capability. It should be understood that this figure is intentionally simplified to show only certain components; the device 910 may include other components beyond those shown in FIG. 9. The device 910 comprises a processing module 911, which includes a microprocessor 912 (or simply a "processor") and operatively associated memory 914 (in the form of RAM or flash memory or both), to enable a variety of device functions and to execute an operating system for running software applications loaded on the device. The device 910 includes a radiofrequency (RF) transceiver 918 for communicating wirelessly with the base station 932 of a wireless network 930. The device 910 may additionally comprise a sensing module 915 configured to determine if a reference stimulus has been actuated.

The RF transceiver 918 may optionally be alternatively or additionally used for communicating directly with a peer device such as a third party wireless communication device, for example as may occur in some ad-hoc networks. The base station 932 may be a cellular base station, wireless access point, or the like. The base station 932 may vary as the wireless device travels, for example, using well-known hand-off processes in cellular networks. The RF transceiver 918 enables access to a wireless communication channel for transmitting and receiving data. The RF transceiver 918 may further allow for a wireless voice channel for transmitting and receiving voice communications, for example concurrently with transmission and reception of data over the same or a separate logical or physical channel.

The mobile device 910 further comprises a location identification module 917, which is configured to determine the location of the mobile device. The location identification module 917 is a GPS receiver chipset for receiving GPS radio signals transmitted from the one or more orbiting GPS satellites 920. The GPS receiver chipset can be embedded within the device or externally connected, such as, for example, a Bluetooth™ GPS puck or dongle. Other systems for determining location may be used in place of GPS, as would be readily understood by a worker skilled in the art.

In terms of input/output devices or user interfaces (UI's) 916, the device 910 may include one or more of the following: a display (e.g. a small LCD screen), a thumbwheel, a trackball, a keyboard, touch screen, a keypad, a button, a USB or serial port for connecting to peripheral equipment, a camera, a display, a speaker and a microphone. The display may optionally have touch-screen functionality.

The user interface may be configured to signal or alert the user of the mobile device that a portion of the sample sets or the route metrics or both do not meet a performance criterion. Such signals may either be visually displayed, or may be an audible signal or a tactile signal (e.g. vibration).

In embodiments, the user interface may be configured to signal to a user of the mobile device running a lap, how their current performance compares with historical performances. Exemplarily, the method of the disclosure may be configured to compare the location data of the current route at one or more specified points of time, with the location data of historical route records (of the same user or other users) at corresponding points of time. Alternatively, the time data of the current route at one or more specified locations may be compared with the time data of historical route records. The user interface may be configured to signal the user if their current performance lags their previous performances. In one embodiment, an audible signal may be configured to be at a high volume if the performance lag is significant and at a low volume if the lag is minimal.

Referring to FIG. 7, the user interface can show the custom routes 716, 717 and the region. The success of the processing required for the determination of the custom route can be indicated using indicator LEDS 'No' 736 and 'Yes' 737. In one embodiment, a failure in determination of a custom route may also be indicated to the user by an audible signal.

The wireless communication device 910 sends and receives communication signals via the RF transceiver 918. When communicating wirelessly with a base station 932 of a wireless network 930, the device 910 may communicate in accordance with one or more appropriate technologies such as: Global Systems for Mobile communications (GSM), General Packet Radio Service (GPRS), Code Division Multiple Access (CDMA) technologies, Wideband CDMA (WCDMA), whether 2G, 3G, High speed packet access (E-SPA), Universal Mobile Telecommunication System (UMTS) based technologies, Long Term Evolution (LTE) technologies, Orthogonal Frequency Division Multiplexing (OFDM) technologies, Ultra-Wideband (UWB) technologies, WiFi™ or WiMAX™ technologies, or other communication technologies and protocols as would readily be understood by a worker skilled in the art. In some embodiments, the wireless device 910 may be capable of operation using multiple protocols. The base station 932 may be part of a wireless network, such as a cellular network, local-area network, wide-area network, wireless hotspot network, or the like. The wireless device, base station, network components, and the like, may be configured for data communication, voice communication, or a combination thereof, possibly using additional components, configurations and procedures where appropriate, such as SIM cards, authorization and authentication procedures, handoff procedures, and the like, as would be readily understood by a worker skilled in the art.

This new technology has been described in terms of specific implementations and configurations (and variants thereof) which are intended to be exemplary only. The scope of the exclusive right sought by the applicant is therefore intended to be limited solely by the appended claims.

The invention claimed is:

1. A method of determining one or more route metrics for a mobile device configured to allow a determination of its location, the method comprising the steps of:
   determining if a reference stimulus is actuated, wherein said reference stimulus is actuated when the first or last actuation of a start reference stimulus option by a plurality of communicatively linked mobile devices is made;
   obtaining and storing in real-time a route record comprising a plurality of sample sets, said sample sets comprising simultaneous time and location data of said mobile device traversing a route after the actuation of the reference stimulus; and
   processing previously stored sample sets to at least partially determine said one or more route metrics.

2. The method of claim 1, wherein said processing is performed in real-time.

3. The method of claim 1, wherein said processing is performed using previously stored sample sets of the same route record or using previously stored sample sets of different route records.

4. The method of claim 1, wherein said processing includes comparing the location data of previously stored sample sets to determine one or more matched sample sets, said comparing based on a match criterion, and determining one or more route timing metrics at least partially using the time data of said matched sample sets.

5. The method of claim 4, wherein a sample set is determined as a matched sample set if a comparison of its location data satisfies a match criterion with the location data of a lap reference sample set obtained at the actuation of a lap reference stimulus, and the time data of said matched sample set and lap reference sample set is used to determine a lap time.

6. The method of claim 4, wherein said route timing metric is a lap time, a split time, an estimated time of arrival, an average lap speed, an instantaneous velocity, or an instantaneous acceleration.

7. The method of claim 4, wherein said match criterion is satisfied if the location data of a first previously stored sample set is within a chosen or pre-determined range of the location data of a second previously stored sample set.

8. The method of claim 1, wherein said processing includes interpolating or extrapolating the location data of previously stored sample sets to determine sample sets of said route record, wherein at least a part of said sample sets is inaccurate, based on an accuracy criterion.

9. The method of claim 1, further comprising creating one or more data files, wherein one or more of the sample sets includes one or more data files, said one or more data files indicative of one or more of an image, text or audio.

10. The method of claim 1, wherein said determining of said route metrics is performed by said mobile device, by a communicatively linked server, or by a communicatively linked peer mobile device.

11. The method of claim 1, further comprising transferring data with one or more peer mobile devices or servers, communicatively linked with said mobile device, said data indicative of one or more of the sample sets.

12. The method of claim 11, wherein at least part of said transfer of data occurs in real-time.

13. The method of claim 1, wherein at least a portion of said sample sets is obtained from a user of said mobile device.

14. The method of claim 1 further comprising:
obtaining one or more parameters of a custom route;
obtaining information for a region proximal to or including a reference point defined by the location data of said mobile device at the actuation of said reference stimulus; and
identifying if any, utilizing at least partially said information for the region and said parameters, one or more routes within said region satisfying said parameters, for selection of a custom route therefrom based on said processing of the previously stored sample sets.

15. A computer program product configured to determine one or more route metrics for a mobile device configured to allow a determination of its location, the computer program product comprising a non-transitory computer readable medium having code embedded therein which, when loaded into a memory and executed on an associated processor, is adapted to perform:
determining if a reference stimulus is actuated, wherein said reference stimulus is actuated when the first or last actuation of a start reference stimulus option by a plurality of communicatively linked mobile devices is made;
obtaining and storing in real-time a route record comprising a plurality of sample sets, said sample sets comprising simultaneous time and location data of said mobile device traversing a route after the actuation of the reference stimulus; and
processing previously stored sample sets to at least partially determine said one or more route metrics.

16. The computer program product of claim 15, wherein said processing includes comparing the location data of previously stored sample sets to determine one or more matched sample sets, said comparing based on a match criterion, and determining one or more route timing metrics at least partially using the time data of said matched sample sets.

17. The computer program product of claim 15, wherein said processing includes interpolating or extrapolating the location data of previously stored sample sets to determine sample sets of said route record, wherein at least a part of said sample sets is inaccurate, based on an accuracy criterion.

18. A mobile device configured to determine one or more route metrics, said mobile device comprising:
a sensing module configured to determine whether a reference stimulus is actuated, wherein said reference stimulus is actuated when the first or last actuation of a start reference stimulus option by a plurality of communicatively linked mobile devices is made, wherein the mobile device is configured to actuate the start reference stimulus based at least in part on one or more signals received by said mobile device from a communicatively linked other mobile device;
a location identification module configured to obtain location data of said mobile device, after receiving a notification from the sensing module that the reference stimulus is actuated; and
a processing module operatively coupled to the sensing module and the location identification module, said processing module configured to obtain time data in a simultaneous fashion with the location identification module obtaining the location data, said time and location data at least partially defining a sample set and a plurality of sample sets defining a route record, said processing module further configured to process previously stored sample sets to at least partially determine said one or more route metrics.

19. The mobile device of claim 18, wherein the processing module is configured to compare the location data of previously stored sample sets to determine one or more matched sample sets, said comparing based on a match criterion, and to determine one or more route timing metrics at least partially using the time data of said matched sample sets.

20. The mobile device of claim 18, wherein the processing module is configured to interpolate or extrapolate the location data of previously stored sample sets to determine sample sets of said route record, wherein at least a part of said sample sets is inaccurate, based on an accuracy criterion.

21. The mobile device of claim 18, further comprising a data collection module configured for collection data indicative of one or more of an image, text, monitoring data and audio, wherein each piece of data can be associated with one or more of the sample sets.

22. The mobile device of claim 18, further comprising a user interface configured to signal a user of the mobile device if said previously stored sample sets or said route metrics at least partially do not meet a performance criterion.

* * * * *